Patented Feb. 17, 1925.

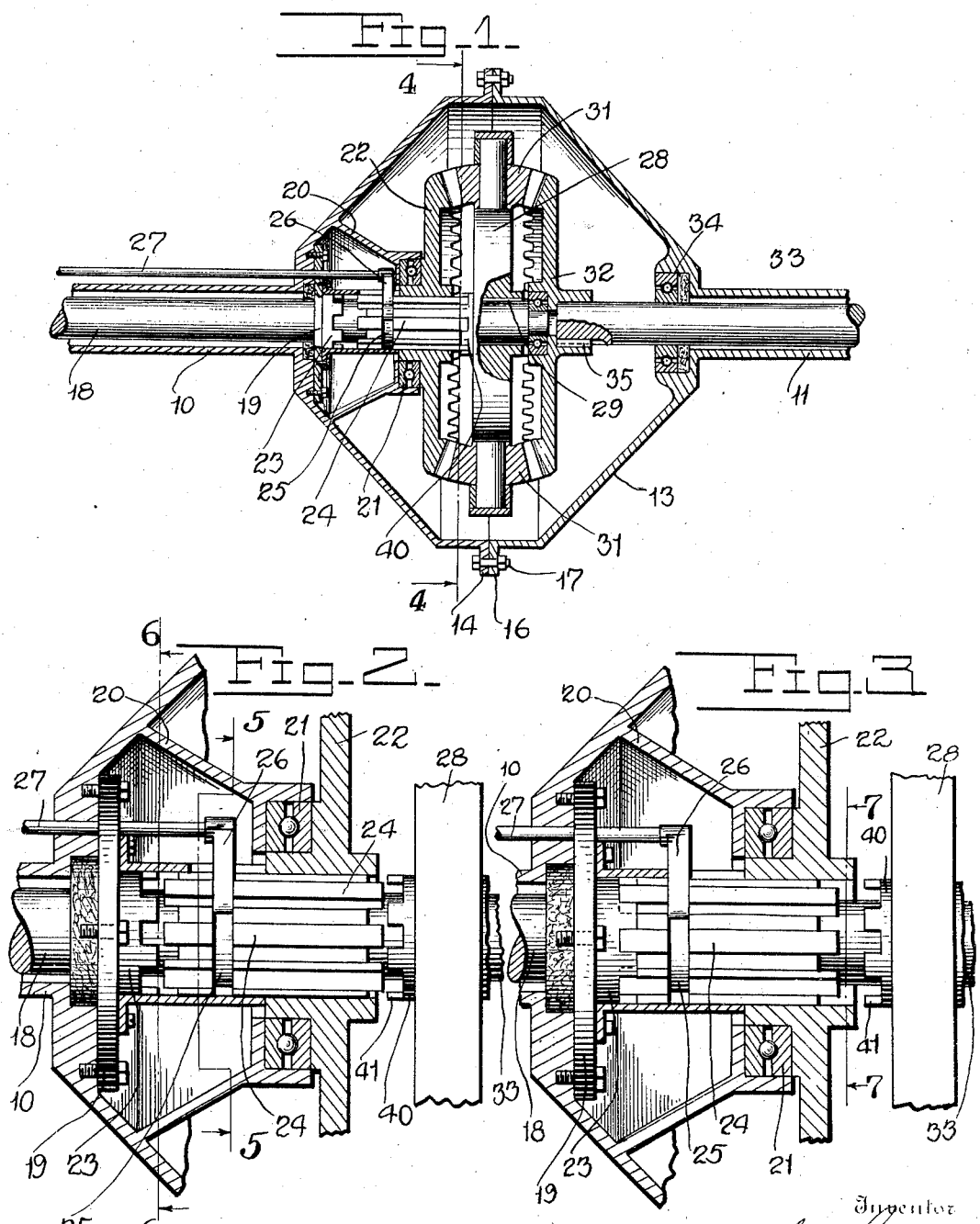

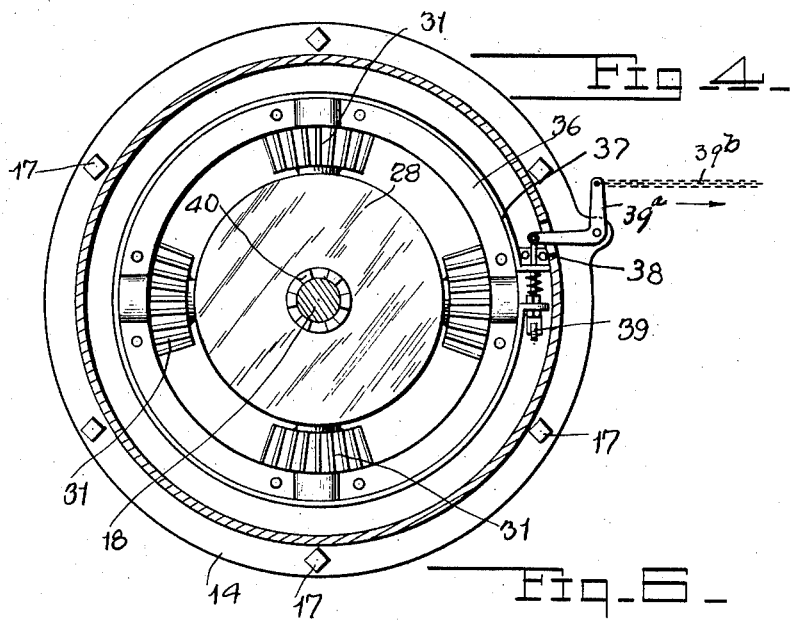
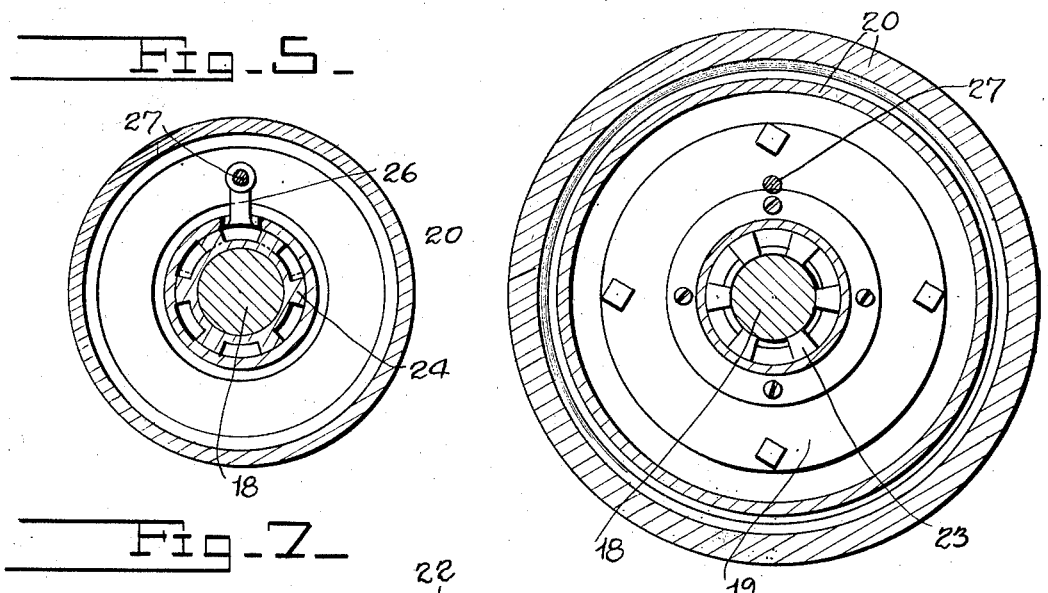

1,526,705

UNITED STATES PATENT OFFICE.

WILBER HUGHES, OF MELBOURNE, FLORIDA.

GEARING FOR AUTOMOBILES.

Application filed March 28, 1924. Serial No. 702,641.

*To all whom it may concern:*

Be it known that I, WILBER HUGHES, a citizen of the United States of America, and resident of Melbourne, in the county of Brevard and State of Florida, have invented certain new and useful Improvements in Gearing for Automobiles, of which the following is a specification.

This invention relates to gearing for automobiles, and has for an object the provision of novel means whereby a section of a drive shaft may be driven with its R. P. M. identical with that of the crank shaft of a motor and whereby the driven section of the shaft may communicate its motion to a sectional extension thereof at the same R. P. M., or, whereby the R. P. M. of the sectional member of the shaft may be increased. The first mentioned section of the shaft may also be driven through the use of a transmission, and the said driven member may communicate its motion to the sectional member at the R. P. M. of the driven section, or by the use of said gearing the sectional shaft, through the use of the gearing, may have an increased R. P. M.

It is a further object of this invention to produce gearing of the character indicated that may be installed on automobiles by providing a sectional drive shaft with gearing interposed between the sections, the said gearing having novel means by which a direct drive of the motor may result, or whereby one section of the drive shaft may be driven at an increased R. P. M. with relation to the other section.

It is a further object of this invention to provide a device associated with a gearing of the character indicated whereby a friction clutch brake may be employed.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view of a drive shaft casing with a drive shaft in elevation therein and a gearing embodying the invention interposed between the sections of the drive shaft;

Figure 2 illustrates an enlarged detail sectional view of a part of the mechanism embodying the invention;

Figure 3 illustrates a similar view with the parts in different positions of adjustment;

Figure 4 illustrates a sectional view on a line corresponding with the line 4—4 of Fig. 1;

Figure 5 illustrates a sectional view on a line corresponding with the line 5—5 of Fig. 2;

Figure 6 illustrates a sectional view on a line corresponding with the line 6—6 of Fig. 2; and Figure 7 illustrates a sectional view on a line corresponding with the line 7—7 of Fig. 3.

In these drawings, 10 denotes a section of a drive shaft casing and 11 an outer section thereof, the two sections being associated with sections 12 and 13, respectively, of a gear housing provided with flanges 14 and 15, respectively, that may be secured together by fastenings 17 such as bolts. The section 18 of the drive shaft is preferably rotatable with the same R. P. M. as the crank shaft of a motor to which it may be connected and the said shaft is rotatable in bearings 19 of the casing section 12. The casing section has an inwardly extending housing 20 which supports a thrust bearing 21 for a beveled gear wheel 22 that is rotatable in the gear housing.

A clutch member 23 is secured to the section 12 of the casing and it coacts with a clutch member 24 that is slidable on the shaft section 18 and splined in the hub of the gear wheel 22. The clutch member has a peripheral slot 25 forming a seat for a yoke 26 which is effective to spline the clutch member axially of the shaft through means of a rod 27 that projects preferably longitudinally of the shaft and may be extended to suitable position from whence it can be manipulated so that by movement of the rod, the clutch member may be moved to the position in which it is shown in Fig. 1, or to the position in which it is shown in Fig. 3, or to a neutral position in which it is shown in Fig. 2.

A spider 28 is secured on the shaft 18 by suitable means such as a key 29 and the spider is therefore rotatable with the shaft 18. The spider has a plurality of trunnions 30 extending radially from it on which pinions 31 are rotatably mounted to mesh with the teeth of the gear wheel 22 and with the teeth of the gear wheel 32 that is secured on the drive shaft extension 33, which latter operates in the shaft casing 11. The gear casing has a bearing 34 for the shaft 33 and the shaft 33 is secured to the gear wheel 32 by suitable fastenings such as a key 35.

A sectional rim 36 is carried by the spider and the said rim is embraced by a brake band 37 maintained in operative position by an anchoring plate 38. The brake band has means 39 for operating it to cause it to press on the rim when the braking action is to be effected, the said brake operating mechanism being of any desired construction, and the inventor does not wish to be limited with respect to the details of construction thereof. As shown, it comprises a bell crank 39$^a$ suitably pivoted with an operating connection such as a chain 39$^b$ that may be run over appropriate guides to position where it may be manipulated by an operator.

As shown in the drawing, the hub 40 of the spider has a series of teeth 41 on its face and these constitute a clutch element with relation to which the teeth of the clutch member 24 coact when the gear wheel 22 and spider are to be locked together during the operation of the device. From an inspection of the drawing and from the foregoing description, it will be apparent that when the clutch member 24 engages the clutch of the spider, the gear wheels 22 and 32 and the pinions of the spider will be locked together so that the shaft section 18 and the shaft section 33 will be driven at the uniform R. P. M. It will also be apparent that when the clutch member 24 is in neutral position, the spider will rotate with relation to the gear wheel 32 without transmitting power to the shaft 33, whereas when the clutch member 24 engages the clutch member 23 that is secured on the housing, it will hold the gear wheel 22 stationary and cause the pinions to drive the gear wheel 32 as the pinions travel around the gear wheel 22, increasing the R. P. M. of the shaft 33 as compared with the R. P. M. of the shaft 18.

It follows from an inspection of the drawing and from the foregoing description, therefore, that when power is desired the two sectional shafts 18 and 33 will be locked together, but when increased speed is desired, the action of the gears will be relied upon to cause the shaft section 33 to rotate faster than the shaft section 18.

I claim:

1. In a gearing for automobiles, sectional drive shafts, a gear mounting therebetween having bearings for the said drive shafts, one of said sections being driven from a motor, a spider on the last mentioned drive shaft having radial trunnions, pinions rotatable thereon, a clutch member secured to the casing of said section of the shaft, a clutch member rigid with the said spider, a clutch member slidable on the shaft and adapted to engage either of said clutch members and having a neutral position therebetween, means for moving the said clutch member, a gear wheel with relation to which the sliding clutch member is splined, the said gear wheel being in engagement with the pinions, a gear wheel secured on the other section of the drive shaft and meshing with said pinions, and means for moving the shiftable clutch member.

2. In a gearing for automobiles, sectional drive shafts, a gear mounting therebetween having bearings for the said drive shafts, one of said sections being driven from a motor, a spider on the last mentioned drive shaft having radial trunnions, pinions rotatable thereon, a clutch member secured to the casing of said section of the shaft, a clutch member rigid with the said spider, a clutch member slidable on the shaft and adapted to engage either of said clutch members and having a neutral position therebetween, means for moving the said clutch member, a gear wheel with relation to which the sliding clutch member is splined, the said gear wheel being in engagement with the pinions, a gear wheel secured on the other section of the drive shaft and meshing with said pinions, means for moving the shiftable clutch member, a rim on the periphery of the spider, and braking mechanism associated therewith.

WILBER HUGHES.